United States Patent
Mori et al.

(10) Patent No.: US 8,943,795 B2
(45) Date of Patent: Feb. 3, 2015

(54) ROCKET ENGINE SYSTEM FOR REALIZING HIGH-SPEED RESPONSE

(75) Inventors: Hatsuo Mori, Tokyo (JP); Yoshihiro Naruo, Sagamihara (JP); Shinichiro Tokudome, Tsukuba (JP); Tsuyoshi Yagishita, Yokohama (JP); Takayuki Yamamoto, Sagamihara (JP); Yoshifumi Inatani, Sagamihara (JP)

(73) Assignees: IHI Corporation (JP); Japan Aerospace Exploration Agency (JP)

( * ) Notice: Subject to any disclaimer, the term of this patent is extended or adjusted under 35 U.S.C. 154(b) by 400 days.

(21) Appl. No.: 13/394,843

(22) PCT Filed: Sep. 3, 2010

(86) PCT No.: PCT/JP2010/065124
§ 371 (c)(1),
(2), (4) Date: Mar. 8, 2012

(87) PCT Pub. No.: WO2011/030719
PCT Pub. Date: Mar. 17, 2011

(65) Prior Publication Data
US 2012/0167552 A1    Jul. 5, 2012

(30) Foreign Application Priority Data
Sep. 8, 2009 (JP) .............................. P2009-207480

(51) Int. Cl.
F02K 9/46 (2006.01)
F04D 13/02 (2006.01)

(52) U.S. Cl.
CPC ................ *F02K 9/46* (2013.01); *F04D 13/028* (2013.01)
USPC .............................................. 60/257; 415/13

(58) Field of Classification Search
CPC ..................................... F02K 9/44; F02K 9/46
USPC ....................................... 60/257–260; 415/13
See application file for complete search history.

(56) References Cited

U.S. PATENT DOCUMENTS

| | | | | |
|---|---|---|---|---|
| 3,224,189 A | * | 12/1965 | Kenny | 60/204 |
| 3,306,038 A | * | 2/1967 | Ferriman | 60/259 |
| 3,623,329 A | | 11/1971 | Abild | |
| 4,697,416 A | * | 10/1987 | Scheller | 60/259 |

(Continued)

FOREIGN PATENT DOCUMENTS

| JP | 10-238408 | 9/1998 |
|---|---|---|
| JP | 11-229963 | 8/1999 |

(Continued)

OTHER PUBLICATIONS

Sutton et al "Rocket Propulsion Elements," 2001, John Wiley & Sons, Inc., Seventh Edition, pp. 227, 362-416.*
International Search Report and Written Opinion mailed Nov. 30, 2010 in corresponding PCT International Application No. PCT/JP2010/065124.
Japanese Notice of Allowance, dated Jun. 3, 2014, issued in corresponding Japanese Patent Application No. 2011-530820. English Translation. Total 6 pages.

(Continued)

*Primary Examiner* — Ted Kim
(74) *Attorney, Agent, or Firm* — Ostrolenk Faber LLP (57) ABSTRACT

Disclosed is a turbo pump in which a pump impeller is connected to one end of a rotary shaft and a turbine is connected to the other end of the rotary shaft. The turbo pump is designed such that an equivalent region, between a turbine efficiency curve obtained on the basis of a conditional expression where the number of rotations of the rotary shaft is maintained constant regardless of a pump flow rate and a turbine efficiency curve of an actual machine, becomes an operation region.

3 Claims, 6 Drawing Sheets

(56) References Cited

U.S. PATENT DOCUMENTS

| | | | |
|---|---|---|---|
| 6,619,031 B1* | 9/2003 | Balepin | 60/246 |
| 2004/0105756 A1* | 6/2004 | Higashimori et al. | 415/206 |
| 2005/0005604 A1* | 1/2005 | Mulloy et al. | 60/602 |

FOREIGN PATENT DOCUMENTS

| | | |
|---|---|---|
| JP | 2002-538346 | 11/2002 |
| JP | 2003-148250 | 5/2003 |
| JP | 2007-016781 | 1/2007 |
| JP | 2008-267385 | 11/2008 |
| RU | 2176744 C2 | 12/2001 |
| RU | 2187684 C2 | 8/2002 |
| RU | 2232915 C2 | 7/2004 |

OTHER PUBLICATIONS

Russian Decision on Grant, dated Jun. 30, 2014, issued in corresponding Russian Patent Application No. 2012113229/06(019956), English Translation. Total 10 pages.

Tsuyoshi Yagishita, et al., "A Development of the 8kN Class Expander Cycle Engine (the $2^{nd}$ Report)", Proceedings of $53^{rd}$ Space Sciences and Technology Conference. Japan. (Sep. 9, 2009). pp. 1984-1989. English Abstract.

Shinichiro Tokudome, et al., "Experimental Study of a High-Speed Response LOX/LH2 Propulsion System with Deep Throttling Capability", Proceedings of the annual meeting and the symposium on propulsion system for reusable launch vehicles, Northern Section of the Japan Society for Aeronautical and Space Sciences 2010, Japan. (Mar. 10, 2010). pp. 272-277. English Abstract.

* cited by examiner

ROCKET ENGINE SYSTEM FOR REALIZING HIGH-SPEED RESPONSE

CROSS-REFERENCE TO RELATED APPLICATIONS

The present application is a 35 U.S.C. §§371 national phase conversion of PCT/JP2010/065124, filed Sep. 3, 2010, which claims priority of Japanese Patent Application No. 2009-207480, filed Sep. 8, 2009, the contents of which are incorporated herein by reference. The PCT International Application was published in the Japanese language.

TECHNICAL FIELD

The present invention relates to a turbo pump and a rocket engine system for realizing high-speed response.

BACKGROUND ART

In recent years, as a liquid-fueled engine which is mounted in an aerospace vehicle, such as a rocket, the use of a turbo pump-type rocket engine in which a propellant (for example, liquid hydrogen as fuel and liquid oxygen as an oxidizer) is pumped to a combustor by a turbo pump to obtain a large propulsive force has become mainstream. For example, Patent Document 1 describes an expander cycle engine, as one form of a turbo pump-type rocket engine, in which liquid hydrogen pumped from a fuel turbo pump is used for regenerative cooling of a combustor and gasified, hydrogen gas is used for driving the fuel turbo pump and the oxidizer turbo pump and then introduced to the combustor, and liquid oxygen is pumped directly to the combustor from the oxidizer turbo pump.

Figure 8A:
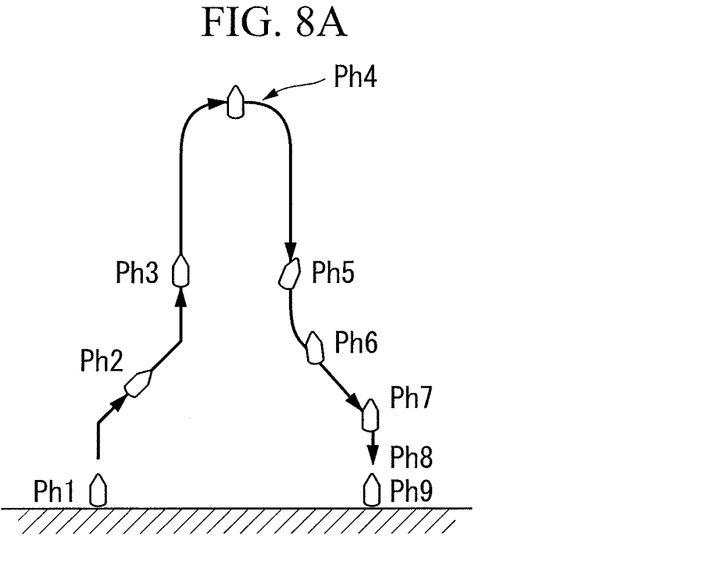
FIG. 8A shows a flight profile of a vertical takeoff and landing aircraft.

This turbo pump-type rocket engine is attracting attention as a rocket engine for a vertical takeoff and landing aircraft. The vertical takeoff and landing aircraft is designed on the assumption that the aircraft flies using the profile shown in FIG. 8. The profile shown in FIG. 8A has Ph1: vertical lift, Ph2: pitch maneuver, Ph3: MECO (Main Engine Cut-Off), Ph4: wide range (hovering), Ph5: re-entry/lift flight, Ph6: approach guide, Ph7: engine resignation, Ph8: landing guide, and Ph9: vertical landing. In Ph4, in addition to wide range (hovering), for example, ballistic flight or orbital flight may be carried out. For this reason, unlike a typical disposable rocket, in a rocket engine which is mounted in a vertical takeoff and landing aircraft, high-speed responsiveness (response frequency equal to or higher than 1 Hz) and wide range thrust variability are required during operation of the rocket engine from controllability against crosswinds during landing or thrust throttling corresponding to the body weight which becomes half that of launching during landing. Above all, high-speed responsiveness and wide range thrust variability are required in the range of Ph1 to Ph2 and Ph7 to Ph9 of FIG. 8A, in particular, in the range of Ph7 to Ph9 during landing.

A conventional rocket engine is designed on the assumption of a one-way operation to the space. In general, in order to minimize a gravity loss, the rocket engine is operated with the maximum thrust at the time of launching, and then the thrust is simply quasi-statically squeezed little by little from the restrictions of body acceleration, aerodynamic load, and the like. That is, the conventional rocket engine is designed on the assumption that the characteristics in the substantially normal state are evaluated, and in general, does not take into consideration thrust responsiveness. This is also applied to a turbo pump-type rocket engine.

Figure 8B:
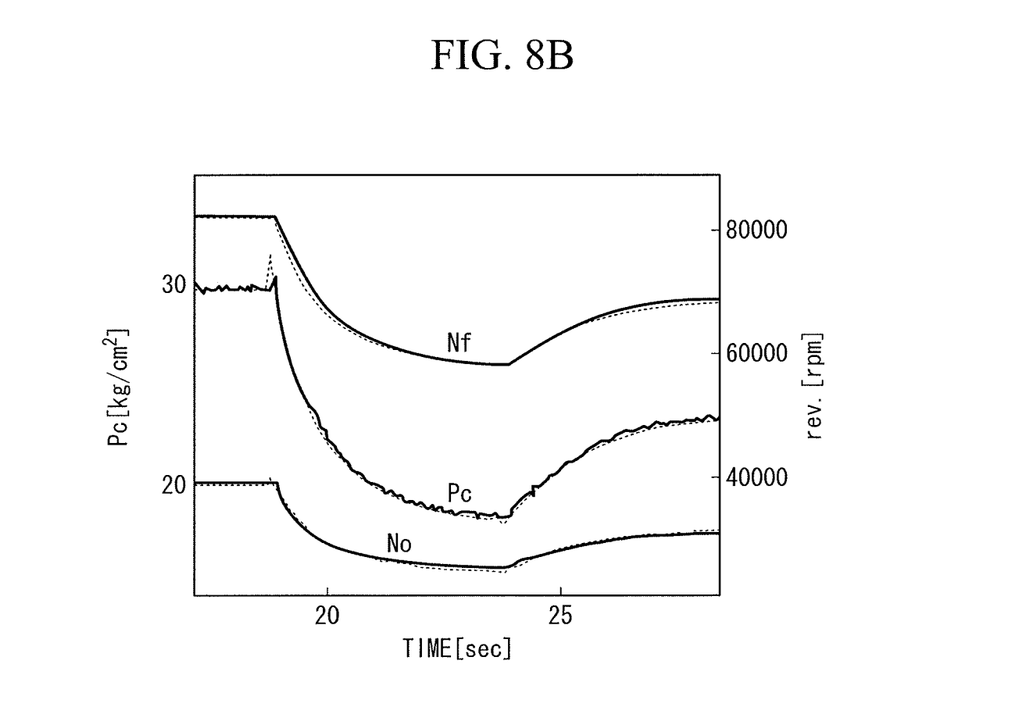
FIG. 8B shows the combustion test result of a conventional turbo pump-type rocket engine.

FIG. 8B shows the combustion test result of a conventional turbo pump-type rocket engine. In FIG. 8B, the horizontal axis represents time (sec), and the vertical axis represents combustion pressure Pc(kg/cm$^2$), the number of rotations Nf (rpm) of the fuel turbo pump, and the number of rotations No (rpm) of the oxidizer turbo pump. As shown in FIG. 8B, it is understood that it takes time, about five seconds, until the combustion pressure Pc corresponding to the engine thrust is lowered from about 30 (kg/cm$^2$) to about 20 (kg/cm$^2$), that is, until the thrust is changed to 66%. When being converted to a response frequency, the response time of five seconds is 0.2 (Hz), and it is not possible to satisfy high-speed responsiveness which is required in a rocket engine for a vertical takeoff and landing aircraft, making it difficult for fine maneuver during landing. From FIG. 8B, it is understood that the numbers of rotations Nf and No of the respective turbo pumps are also changed with a change in the thrust (a change in combustion pressure Pc).

CITATION LIST

Patent Document

[Patent Document 1] Japanese Unexamined Patent Application, First Publication No. H11-229963

SUMMARY OF INVENTION

Technical Problem

As described above, in the conventional turbo pump-type rocket engine, it is not possible to satisfy high-speed responsiveness which is required in a rocket engine for a vertical takeoff and landing aircraft, and it is difficult to contribute to takeoff and landing. As shown in FIG. 8B, from the fact that the time necessary until the number of rotations corresponding to the current thrust is changed to the new number of rotations appears as a response lag of the thrust, the moment of inertia of the turbo pump rotary shaft is considered to be a factor for deterioration in responsiveness of the conventional turbo pump-type rocket engine.

Accordingly, it can be easy to imagine that it is preferable to reduce the moment of inertia of the turbo pump so as to improve responsiveness of the turbo pump-type rocket engine. In order to reduce the moment of inertia of the turbo pump, it is necessary to decrease the diameter of the rotor or to use a lightweight constituent material. Although a detailed calculation method will not be described, if it is assumed that the majority of the moment of inertia of the turbo pump depends on a disk portion serving as a pump impeller or a turbine disk, the diameter of the disk is set to be about half of an actual condition value under the condition that the material density is constant, thereby reducing the moment of inertia to 1/10 (that is, an improvement in responsiveness about ten times is achieved).

However, since a factor which determines the performance of the turbo pump is the peripheral velocity (circumferential velocity) of the disk, in order to maintain the same performance, it is necessary to increase the number of rotations by an amount corresponding to a decrease in the diameter of the disk. In particular, since a turbo pump which is used in a rocket engine mounted in an aerospace vehicle, such as a vertical takeoff and landing aircraft, is operated near the upper limit of the mechanical number of rotations which is allowable for a bearing or a seal, it is not easy to operate the turbo pump with the number of rotations two or more times greater than the actual condition. Since an increase in the number of rotations causes an increase in the centrifugal force beyond a decreasing effect on the moment of inertia, there is a need to change the material of the disk portion or increase the thickness so as to maintain durability, consequently leading to an increase in the weight. For this reason, it is difficult to reduce the moment of inertia as calculated.

The invention has been finalized in consideration of the above-described situations, and an object of the invention is to provide a turbo pump and a rocket engine capable of realizing high-speed response without depending on the moment of inertia of the rotary shaft.

Solution to Problem

In order to solve the above-described problems, the invention provides a turbo pump in which a pump impeller is connected to one end of a rotary shaft, and a turbine is connected to the other end of the rotary shaft. The turbo pump is designed such that an equivalent region, between a turbine efficiency curve obtained on the basis of a conditional expression where the number of rotations of the rotary shaft is maintained constant without depending on a pump flow rate and a turbine efficiency curve of an actual machine, becomes an operation region.

In the turbo pump, the conditional expression is expressed by Expression (4) having turbine efficiency $\eta t$, pump efficiency $\eta p$, a head coefficient $\Psi$, a pump flow rate Q, the number of rotations Nc, turbine enthalpy drop $\Delta H$, and turbine entrance fuel density $\rho$.

$$\eta t(Q/Nc) = \frac{Nc^2 \Psi(Q/Nc)}{\eta p(Q/Nc) \rho \Delta H} \quad (4)$$

A rocket engine according to the invention includes a fuel turbo pump and an oxidizer turbo pump. The entire system including the fuel turbo pump is designed such that, in at least the fuel turbo pump, an equivalent region, between a turbine efficiency curve obtained on the basis of a conditional expression where the number of rotations of the rotary shaft is maintained constant without depending on a pump flow rate and a turbine efficiency curve of an actual machine, becomes an operation region.

In the rocket engine, the conditional expression is expressed by Expression (4) having turbine efficiency $\eta t$, pump efficiency $\eta p$, a head coefficient $\Psi$, a pump flow rate Q, the number of rotations Nc, turbine enthalpy drop $\Delta H$, and turbine inlet fuel density $\rho$.

In the rocket engine, fuel sent from the fuel turbo pump flows into a regenerative cooling heat exchanger provided in a combustor through a fuel-side thrust control valve provided on the downstream side of the fuel turbo pump, is gasified to become gas fuel, is used for turbine driving of the fuel turbo pump and the oxidizer turbo pump, and is supplied to the combustor. An oxidizer sent from the oxidizer turbo pump is supplied to the combustor through an oxidizer-side thrust control valve provided on the downstream side of the oxidizer turbo pump.

Advantageous Effects of Invention

According to the invention, since a turbo pump can be operated in an operation region where the number of rotations of the rotary shaft is maintained constant without depending on the pump flow rate, it is possible to provide a turbo pump and a rocket engine capable of realizing high-speed response without depending on the moment of inertia of the rotary shaft.

DESCRIPTION OF EMBODIMENTS

Hereinafter, an embodiment of the invention will be described with reference to the drawings. The following description will be provided as to an expander cycle engine, in which liquid hydrogen ($LH_2$) is used as fuel and liquid oxygen (LOX) is used as an oxidizer, as a rocket engine including a turbo pump according to the invention.

Figure 1:
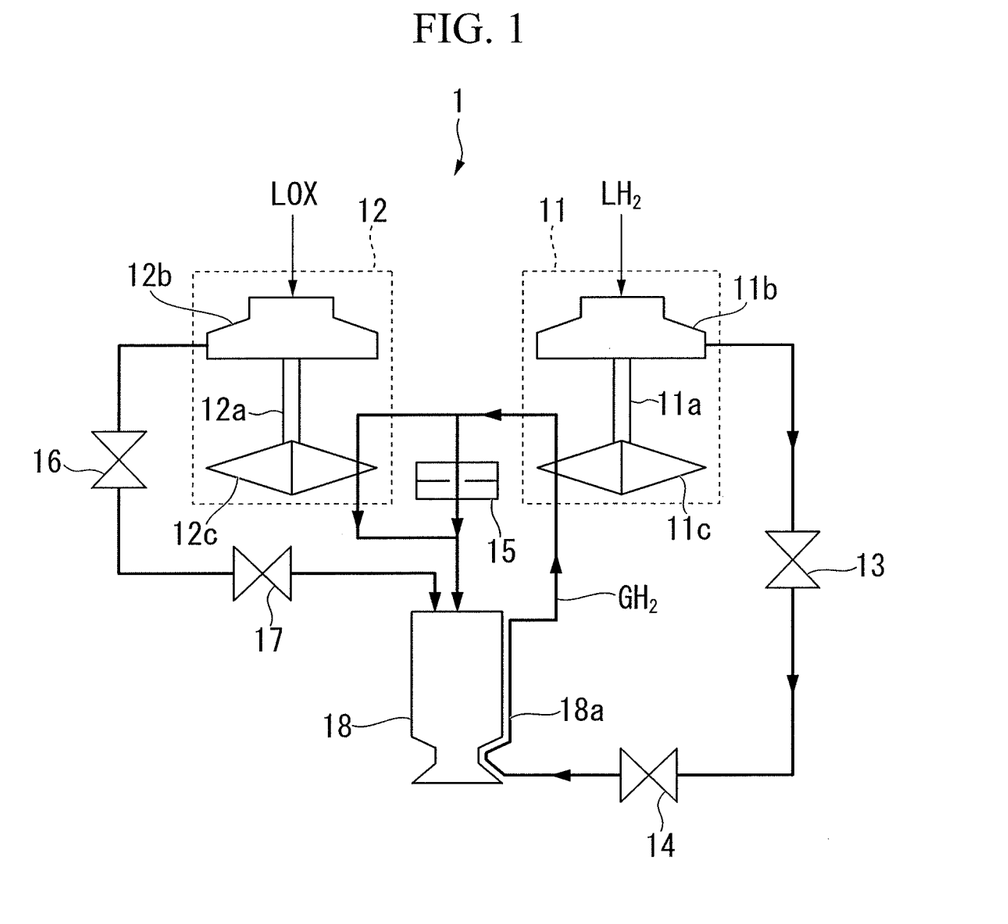
FIG. 1 is a schematic configuration diagram of a rocket engine 1 according to an embodiment of the invention.

FIG. 1 is a schematic configuration diagram of a rocket engine 1 of this embodiment. As shown in FIG. 1, the rocket engine 1 of this embodiment schematically includes a fuel turbo pump 11, an oxidizer turbo pump 12, a fuel-side thrust control valve 13, a fuel-side main valve 14, a bypass orifice 15, an oxidizer-side thrust control valve 16, an oxidizer-side main valve 17, and a combustor 18.

The fuel turbo pump 11 is a centrifugal turbo pump in which a pump impeller 11b is connected to one end of a rotary shaft 11a rotatably supported in a body casing, and a turbine 11c is connected to the other end of the rotary shaft 11a. The fuel turbo pump 11 pumps liquid hydrogen supplied from a fuel tank (not shown) to the combustor 18.

The oxidizer turbo pump 12 is a centrifugal turbo pump in which a pump impeller 12b is connected to one end of a rotary shaft 12a rotatably supported in a body casing, and a turbine 12c is connected to the other end of the rotary shaft 12a. The oxidizer turbo pump 12 pumps liquid oxygen (LOX) supplied from an oxidizer tank (not shown) to the combustor 18.

Liquid hydrogen supplied to the fuel turbo pump 11 is increased in pressure by the rotation operation of the pump impeller 11b which is driven by the turbine 11c, and is then sent to the fuel-side thrust control valve 13 provided on the downstream side of the fuel turbo pump 11. The fuel-side thrust control valve 13 is an electronically controlled valve whose opening is adjusted in accordance with a control signal input from a control device (not shown). That is, liquid hydrogen sent from the fuel turbo pump 11 is adjusted in flow rate by the fuel-side thrust control valve 13, and is then sent to the fuel-side main valve 14 provided on the downstream side.

Although the fuel-side main valve 14 is an electronically controlled valve which is the same as the fuel-side thrust control valve 13, the fuel-side main valve 14 is adjusted to a fully open state during engine operation and to a fully closed state during engine stoppage. That is, during engine operation, liquid hydrogen which is adjusted in flow rate by the fuel-side thrust control valve 13 passes through the fuel-side main valve 14 while maintaining the flow rate, flows into a regenerative cooling heat exchanger 18a provided at a nozzle wall of the combustor 18 and a combustion chamber wall, and is used for regenerative cooling of the combustor 18.

As described above, liquid hydrogen which is used for regenerative cooling of the combustor 18 is heated and gasified while passing through the regenerative cooling heat exchanger 18a to become high-temperature and high-pressure gas hydrogen ($GH_2$). High-temperature and high-pressure gas hydrogen ($GH_2$) flows into a turbine inlet of the fuel turbo pump 11 from the regenerative cooling heat exchanger 18a, and is used for rotational driving of the turbine 11c. Gas hydrogen flowing from a turbine outlet of the fuel turbo pump 11 flows into a turbine inlet of the oxidizer turbo pump 12, is used for rotational driving of the turbine 12c, and is then sent from a turbine outlet to the combustor 18.

Part of gas hydrogen flowing from the turbine outlet of the fuel turbo pump 11 is sent to the combustor 18 through the bypass orifice 15. The bypass orifice 15 is used to adjust the flow rate of gas hydrogen flowing into the combustor 18.

Liquid oxygen supplied to the oxidizer turbo pump 12 is increased in pressured by the rotational operation of the pump impeller 12b which is driven by the turbine 12c, and is then sent to the oxidizer-side thrust control valve 16 provided on the downstream side of the oxidizer turbo pump 12. The oxidizer-side thrust control valve 16 is an electronically controlled valve which is the same as the fuel-side thrust control valve 13. That is, liquid oxygen sent from the oxidizer turbo pump 12 is adjusted in flow rate by the oxidizer-side thrust control valve 16, and is then sent to the oxidizer-side main valve 17 provided on the downstream side.

Similarly to the fuel-side main valve 14, the oxidizer-side main valve 17 is an electronically controlled valve which is adjusted to a fully open state during engine operation and to a fully closed state during engine stoppage. That is, during engine operation, liquid oxygen which is adjusted in flow rate by the oxidizer-side thrust control valve 16 passes through the oxidizer-side main valve 17 while maintaining the flow rate and is directly sent to the combustor 18.

The combustor 18 mixes and combusts gas hydrogen and liquid oxygen supplied in the above-described manner in the combustion chamber, and generates a thrust by ejecting high-temperature and high-pressure gas generated by the combustion from the nozzle provided in the lower part.

The rocket engine 1 of this embodiment configured as above controls thrust by adjusting the openings of the fuel-side thrust control valve 13 and the oxidizer-side thrust control valve 16 to adjust the flow rate of liquid hydrogen (gas hydrogen) and liquid oxygen which are supplied to the combustor 18.

In the above-described rocket engine 1, in order to realize the high-speed response of thrust control, the entire system including the fuel turbo pump 11 is designed such that an equivalent region, between a turbine efficiency curve obtained on the basis of a conditional expression (Expression (4)) where the number of rotations of the rotary shaft is maintained constant without depending on the pump flow rate and a turbine efficiency curve of an actual machine, becomes a turbine operation region of the fuel turbo pump 11 (for example, a turbine inlet area defining the flow rate passing through the turbine 11c, pipe resistance of liquid hydrogen, or the like).

Hereinafter, description will be provided as to the reason for which the high-speed response of thrust control can be realized when the equivalent region, between the turbine efficiency curve obtained on the basis of the conditional expression where the number of rotations of the rotary shaft is maintained constant without depending on the pump flow rate and the turbine efficiency curve of the actual machine, becomes the turbine operation region of the fuel turbo pump 11.

The equivalent region means that the difference between ideal turbine efficiency (turbine efficiency required for highs-speed response) and actually manufacturable turbine efficiency (realizable turbine efficiency) is equal to or smaller than 5%, and more preferably, is equal to or smaller than 3%. The reason for which the difference is equal to or smaller than 5% is that, if the difference is greater than 5%, variations in the number of rotations of the turbo pump become conspicuous, and the intended condition that the number of rotations is constant is not satisfied.

As described above, although the factor for deterioration in responsiveness of the turbo pump-type rocket engine is the moment of inertia of the rotary shaft of the turbo pump, it is difficult to realize a high-speed response by design variation such that the moment of inertia is reduced. Accordingly, the inventors have thought from another viewpoint that, if the number of rotations is constant without depending on the thrust, in other words, without depending on the pump flow rate, the influence of the moment of inertia may be eliminated, and has been given the following consideration.

[Condition that the Number of Rotations of the Rotary Shaft is Maintained Constant without Depending on the Pump Flow Rate]

A balance point N of the number of rotations of the turbo pump becomes a point at which Expression (1) where torque Tt generated by the turbine and torque Tp consumed by the pump are identical is satisfied. In Expression (1), Ixx is the moment of inertia.

$$\frac{2\pi}{60} Ixx \frac{dN}{dt} = Tt - Tp = 0 \tag{1}$$

The turbine Tt generated by the turbine is expressed by Expression (2), and the torque Tp consumed by the pump is expressed by Expression (3). In Expressions (2) and (3), $\Psi$ represents a head coefficient, $\eta p$ represents pump efficiency, $\eta t$ represents turbine efficiency, Q represents the pump flow rate, mt (a black dot above m) represents the turbine flow rate, $\Delta H$ represents turbine enthalpy drop, U represents the turbine circumferential velocity, C0 represents the turbine inlet velocity, Q/N represents the pump flow rate coefficient, and U/C0 represents the turbine velocity ratio.

$$Tt = \frac{\eta t(U/C0)\dot{m}t\Delta H}{\frac{2\pi}{60}N} \quad (2)$$

$$Tp = \frac{\Psi N^2 Q}{\frac{2\pi}{60}N\eta p(Q/N)} \quad (3)$$

The pump flow rate Q and the turbine flow rate mt (a black dot above m) are constantly identical. The turbine circumferential velocity U can be expressed in association with the number of rotations N. From this, a conditional expression where the number of rotations N is maintained constant without depending on the pump flow rate Q (in other words, without depending on a generated thrust) is expressed by Expression (4). In Expression (4), ρ represents turbine inlet fuel density.

$$\eta t(Q/Nc) = \frac{Nc^2 \Psi(Q/Nc)}{\eta p(Q/Nc)\rho\Delta H} \quad (4)$$

When the range (for example, 0.3 Q to 1.1 Q) of the pump flow rate Q which will be changed from an engine thrust request and the design number of rotations Nc which is not changed are given, it should suffice that a turbine efficiency function satisfies Expression (4) within the range of corresponding Q/Nc. Expression (4) means that, even when the pump flow rate Q is changed, if the turbo pump characteristics (turbine efficiency ηt, pump efficiency ηp, and the head coefficient Ψ) and the operation condition (turbine enthalpy drop ΔH) can be determined such that equality is always established, the number of rotations Nc of the rotary shaft is always maintained constant. As a result, responsiveness of thrust control does not depend on the moment of inertia Ixx of the turbo pump. This means that responsiveness is capable of realizing a high-speed response.

[Assumption of a Characteristic Function Relating to the Turbo Pump]

A condition for stabilizing the relation between turbo pump characteristic values over a wide range required for throttling on the basis of the above-described consideration is studied as follows. With regard to the flow of the study, a function system of a general turbo pump is defined, and the function system is simplified.

(1) Head Coefficient Ψ

A pressure increase ΔP of the centrifugal turbo pump is obtained by subtracting a pressure loss due to structural internal fluid resistance R from so-called input head Hi expressed by the square of the number of rotations, and generally expressed by Expression (5) taking into consideration a shift from the optimum inflow Qs (shockless) in a suction portion. In Expression (5), $AN^2$ represents input head (=Hi), $RQ^2$ represents an internal pressure loss, and $K(Q-Qs)^2$ represents a collisional loss.

$$\Delta P = AN^2 - RQ^2 - K(Q-Qs)^2 \quad (5)$$

From Expression (5), the head coefficient Ψ is defined as Expression (6). However, there is a need for giving attention that the optimum inflow Qs and the number of rotations N have a relationship Qs=BN with a certain coefficient B. Expression (6) is called a pump complete characteristic curve. When the plane Ψ and Q/N is taken into consideration, the second term on the right side has the effect of slightly shifting an upward convex quadratic curve with an apex at Q/N=0.

$$\Delta P = AN^2 - RQ^2 - KQ^2 + 2KQQs + KQs^2$$

$$\frac{\Delta P}{N^2} = (A+KB^2) + 2KB\left(\frac{Q}{N}\right) - (R+K)\left(\frac{Q}{N}\right)^2 \quad (6)$$

$$\Psi = \frac{\Delta P}{N^2} = \psi_1 - \psi_2\Phi - \psi_3\Phi^2$$

$$\Psi = Q/N$$

(2) Pump Efficiency ηp

Pump efficiency ηp is the ratio of power Wo used for an increase in pressure as an intended purpose among power Wi input from the outside through the rotary shaft, and is defined as Expression (7). The power Wo for an increase in pressure is expressed by Expression (8), and the input power Wi is expressed by Expression (9) when various losses Wl are taken into consideration.

$$\eta p = \frac{Wo}{Wi} \quad (7)$$

$$Wo = \Delta PQ \quad (8)$$

$$Wi = Wo + Wl \quad (9)$$

From Expressions (7) to (9), pump efficiency ηp is expressed by Expression (10).

$$\eta p = \frac{Wo}{Wo + Wl} \quad (10)$$
$$= \frac{\Delta PQ}{\Delta PQ + Wl}$$
$$= \frac{\Psi N^2 Q}{\Psi N^2 Q + Wl}$$
$$= \frac{\Psi \frac{Q}{N}}{\Psi \frac{Q}{N} + \frac{Wl}{N^3}}$$

Although it is not assured that the loss Wl is a homogenous cubic function relating to N and Q, general losses are listed as follows. Description is focused on a function form, thus the details of respective coefficients will not be described. Expression (11) represents a mechanical loss (disk), Expression (12) represents a mechanical loss (friction), Expression (13) represents a fluid loss, and Expression (14) represents a recirculation loss.

$$Lm = KpN^3 \quad (11)$$

$$Lm = KmN^3 \quad (12)$$

$$Lh = \Psi_2 Q^2 N + \Psi_3 Q^3 \quad (13)$$

$$Lr = KrN(N-DQ)^2 \quad (14)$$

Since these losses are all homogenous cubic forms, the loss W1 can be described as a function of Q/N alone. Although the mechanism of the loss has a portion which is not expressed in a cubic form, it is assumed that a comparatively satisfactory approximation is taken. At this time, if it is assumed that the loss W1 is Ψ=Q/N which is a cubic form of Q/N, pump efficiency TT is expressed by Expression (15). In regard to the denominator of Expression (15), if the coefficients are reassigned, a general form of pump efficiency ηp is expressed by Expression (16).

$$\eta p = \frac{\Psi\Phi}{\Psi\Phi + L_3\Phi^3 + L_2\Phi^2 + L_1\Phi + L_0} \quad (15)$$

$$\eta p = \frac{\Psi\Phi}{L_2\Phi^2 + L_1\Phi + L_0} \quad (16)$$

(3) Turbine Efficiency ηt

Turbine efficiency ηt is the recovery rate of enthalpy which is adiabatically emitted from inflown gas. The power Wi for adiabatic emission between the turbine inlet and outlet is expressed by Expression (17) using a gas inflow velocity C0. Power Wt recovered by the turbine is expressed by Expression (18) using relative velocities W1 and W2 with respect to the rotor. In Expression (18), β1 and β2 are relative inflow and outflow angles with respect to the rotor.

$$Wi = \frac{1}{2}\dot{m}C0^2 \quad (17)$$

$$Wt = \dot{m}U(W1\cos\beta1 + W2\cos\beta2) \quad (18)$$

From these, turbine efficiency ηt is expressed by Expression (19), and if the relative velocities W1 and W2 with respect to the rotor are rewritten using a rotor internal velocity coefficient ϕr and a nozzle inflow angle α, Expression (20) is obtained. This is an upward convex quadratic function form which passes through the origin.

$$\eta t = \frac{\dot{m}U(W1\cos\beta1 + W2\cos\beta2)}{\frac{1}{2}C0^2} \quad (19)$$

$$\eta t = 2\left(1 + \phi r\frac{\cos\beta1}{\cos\beta2}\right)\left(\frac{U}{C0}\right)\left(\cos\alpha - \left(\frac{U}{C0}\right)\right) \quad (20)$$

If U/C0 of Expression (20) is modified using a turbine radius Rt, the number of rotations N, the pump flow rate Q, and a constant γ, Expression (21) is obtained. Expression (21) represents an ideal turbine efficiency function (a turbine efficiency curve of an actual machine) based on the characteristics of an actual pump.

$$\eta t = 2\left(1 + \phi r\frac{\cos\beta1}{\cos\beta2}\right)\left(\frac{2\pi Rt}{60\gamma}\right)^2\left(\frac{N}{Q}\right)\left(\frac{60\gamma\cos\alpha}{2\pi Rt} - \left(\frac{N}{Q}\right)\right) \quad (21)$$

$$= M_2\left(\frac{N}{Q}\right)^2 - M_1\left(\frac{N}{Q}\right)$$

where $M_1 = 2\left(1 + \phi r\frac{\cos\beta1}{\cos\beta2}\right)\frac{2\pi Rt}{60\gamma},$ $M_2 = 2\left(1 + \phi r\frac{\cos\beta1}{\cos\beta2}\right)\left(\frac{2\pi Rt}{60\gamma}\right)^2$

[Study on a Solution Allowing a High-Speed Response]

Figure 2:
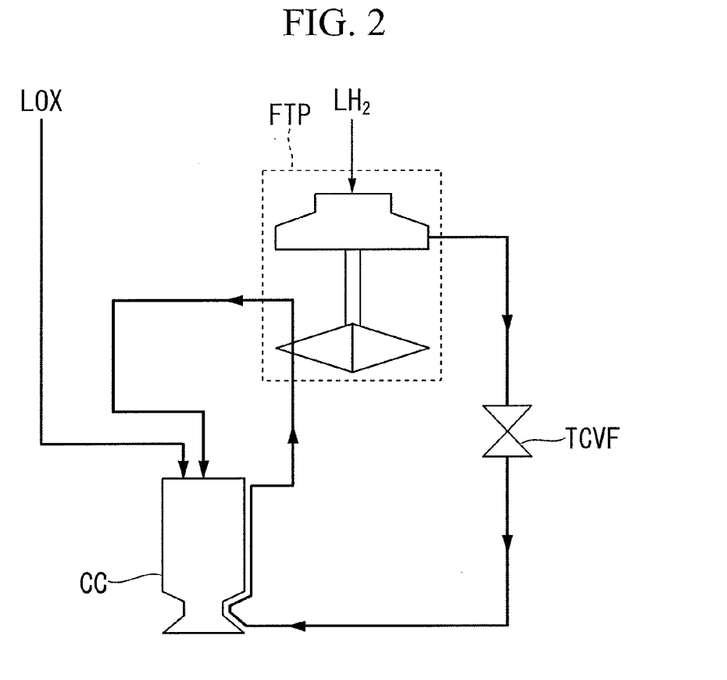
FIG. 2 shows a rocket engine model which is used to examine the solution of a high-speed response.

On the basis of the consideration result, whether or not there is a solution allowing a high-speed response is studied using the rocket engine model shown in FIG. 2. In the rocket engine model, it is assumed that a turbo pump FTP is mounted only on the fuel side, and fuel is supplied from the turbo pump FTP to a combustor CC after passing through a regenerative cooling heat exchanger of CC and the turbine of the turbo pump FTP through a fuel-side thrust control valve TCVF. It is also assumed that an oxidizer is forcibly supplied to the combustor CC such that the mixture ratio MR with fuel is constant. Thrust control is performed by changing fluid resistance of the fuel-side thrust control valve TCVF connected in series on the downstream side of the pump to adjust the flow rate of fuel.

Now, if fluid resistance on the upstream side of the regenerative cooling heat exchanger is Rtcv, and fluid resistance on the downstream side thereof is Ro, the relation between the pressure from the fuel tank (not shown) (tank pressure Ptnk) to the combustor CC (combustion pressure Pc) through the turbine inlet (turbine inlet pressure Pt) and a volume flow rate Q when passing through the pump is expressed by Expressions (22) and (23) using Expression (6).

$$Pc = Ptnk + \psi_1 Nc^2 - \psi_2 NcQ - \psi_3 Q^2 - \frac{\rho p^2}{\rho o}RoQ^2 - \rho p Rtcv Q^2 \quad (22)$$

$$Pt = Ptnk + \Psi_1 Nc^2 - \Psi_2 NcQ - \Psi_3 Q^2 - \rho p Rtcv Q^2 \quad (23)$$

It is assumed that number of rotations Nc of the turbo pump FTP has a constant value regardless of the flow rate Q. If Expressions (22) and (23) are combined, and careful attention is given to Pc=αQ, the turbine inlet pressure Pt is expressed by Expression (24).

$$Pt = \alpha Q + \frac{\rho p^2}{\rho o}RoQ^2 \quad (24)$$

However, most of the pressure loss in the actual turbo pump FTP occurs due to turbine expansion, and in that portion, the turbo pump FTP is usually operated in a choke state or a similar situation. From this, Expression (24) is approximately expressed by Expression (25). The condition that the turbine inlet pressure Pt substantially varies in proportion to a change in the combustion pressure Pc is an adequate approximation in a system where turbine outlet line resistance is small.

$$Pt \approx \alpha' Q \quad (25)$$

Although a detailed calculation method will not be described, the turbine speed ratio U/C0 is expressed by Expression (26) due to the reciprocal of the flow rate coefficient Φ(=Q/N). In Expression (26), β3 is a constant, Rt is a turbine radius, and Tt is a turbine inlet temperature.

$$\frac{U}{C0} = \frac{2\pi Rt}{60\beta 3} \frac{Pt}{Tt} \frac{1}{\Phi} \quad (26)$$

If Expression (25) is substituted in Expression (26), Expression (27) is obtained.

$$\frac{U}{C0} = \frac{2\pi Rt}{60\beta 3} \frac{\alpha' Q}{Tt} \frac{Nc}{Q} \quad (27)$$

$$= \frac{2\pi Rt\alpha'}{60\beta 3} \frac{Nc}{Tt}$$

Although the turbine inlet temperature Tt is considered to be a loss in the turbo pump FTP or heat from the outside, it is assumed that temperature increases only in the regenerative cooling heat exchanger. In general, although a temperature rise $\Delta T$ of a refrigerant when passing through the regenerative cooling heat exchanger is expressed as a function of the combustion pressure Pc, the mixture ratio MR, and the cooling flow rate Q, since it is assumed that the mixture MR is constant and the combustion pressure Pc is in proportion to the flow rate Q, the temperature rise $\Delta T$ is expressed by a function of only the flow rate Q as Expression (28).

$$\Delta T = \Delta T(Pc, C^*, Q) = \Delta T(Pc, C^*(Pc, MR), Q) = \Delta T(Q) \quad (28)$$

If inherent temperature of the fluid is added in the regenerative cooling heat exchanger inlet, similarly, the turbine inlet temperature Tt can be described as a function Tt(Q) of only the flow rate Q. From the above, the turbine speed ratio U/C0 expressed by Expression (27) is expressed by Expression (29) as a function of only the flow rate Q under the condition that the number of rotations Nc is fixed.

$$\frac{U}{C0} = \frac{2\pi Rt\alpha' Nc}{60\beta 3} \frac{1}{Tt(Q)} \quad (29)$$

Next, if Expressions (6) and (16) are substituted in Expression (4) which is a conditional expression where the number of rotations N (Nc) is maintained constant regardless of the pump flow rate Q (in other words, regardless of the generated thrust), Expression (30) is obtained.

$$\eta' t(Q/Nc) = \frac{Nc^2 \Psi(Q/Nc)}{\eta p(Q/Nc)\rho\Delta H} \quad (30)$$

$$= \frac{(L_2\Phi^2 + L_1\Phi + L_0)Nc^2}{\Phi\rho\Delta H}$$

$$= \left(\frac{\Phi \frac{\rho\Delta H}{Nc^2}}{L_2\Phi^2 + L_1\Phi + L_0}\right)^{-1}$$

From Expression (30), it is understood that turbine efficiency lit of the turbo pump FTP which satisfies the condition that the number of rotations N is maintained constant regardless of the pump flow rate Q is expressed by a characteristic vector $(L_0, L_1, L_2)$ for pump efficiency $\eta p$ and a turbine operation condition $\rho\Delta H/Nc^2$, which corresponds to head in the pump. That is, the turbine operation condition is determined by turbine inlet fuel density $\rho$, turbine enthalpy drop $\Delta H$, and the number of rotations Nc. If these parameters are balanced, it becomes possible to realize the turbo pump FTP with no variation in the number of rotations and to consequently realize a rocket engine.

From Expression (21), the ideal turbine efficiency function (the turbine efficiency curve of the actual machine) based on the characteristics of the actual pump is generally an upward convex quadratic function. In comparison of Expression (21) (the turbine efficiency curve of the actual machine) and Expression (30) (the turbine efficiency curve obtained on the basis of the conditional expression where the number of rotations of the rotary shaft is maintained constant regardless of the pump flow rate), it is understood that both do not completely coincide with each other. Accordingly, it is expected that it is difficult to universally realize a turbine which shows an ideal response. However, if only a limited region is focused on, it is easy to imagine that an ideal state is approximately satisfied.

When $\xi = \Phi - 1$, and if Expression (30) is modified using $\xi$, Expression (31) is obtained. If Expression (21) is modified, Expression (32) is obtained. Expression (31) is a downward convex curve which has an offset amount $L'_1$, and gradually approaches $L'_0 \xi$ in due course.

$$\eta_1 t(\xi) = L'_2 \xi^{-1} + L'_1 + L'_0 \xi, \left(L'i = Li\frac{Nc^2}{\rho\Delta H}\right) \quad (31)$$

$$\eta_2 t = M_2 \xi^2 - M_1 \xi \quad (32)$$

Figure 3:
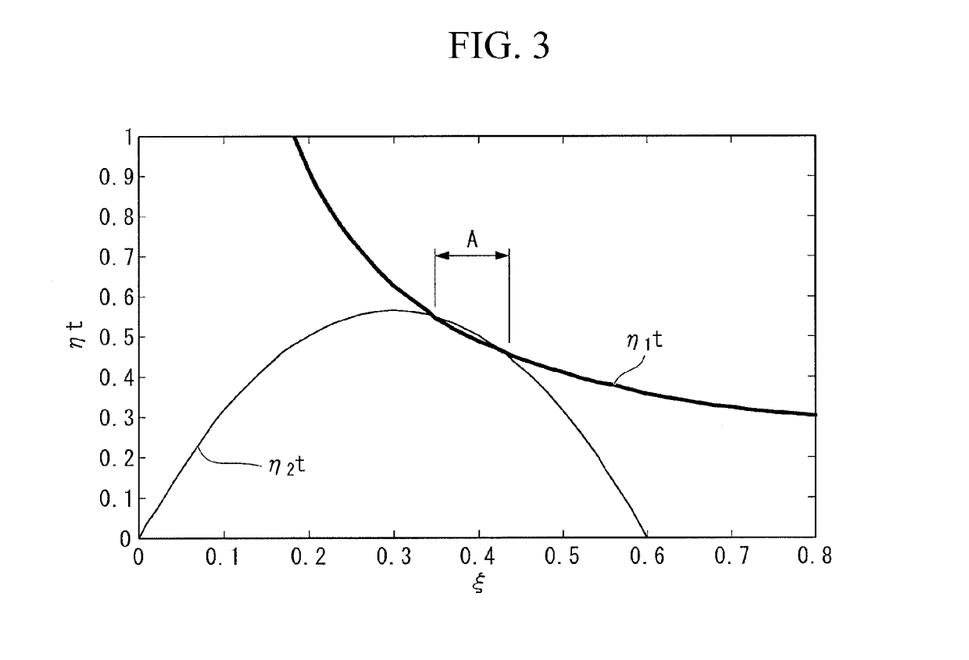
FIG. 3 is a diagram showing a turbine efficiency curve $\eta_1 t$ (a turbine efficiency curve required for a high-speed response) obtained on the basis of a conditional expression where the number of rotations of a rotary shaft is maintained constant regardless of a pump flow rate and a turbine efficiency curve $\eta_2 t$ (a realizable turbine efficiency curve) of an actual machine.

In FIG. 3, the turbine efficiency curve $\eta_1 t$ (the turbine efficiency curve obtained on the basis of the conditional expression where the number of rotations of the rotary shaft is maintained constant regardless of the pump flow rate) obtained from Expression (31) and the turbine efficiency curve $\eta_2 t$ (the turbine efficiency curve of the actual machine) obtained from Expression (32) are plotted on a two-dimensional coordinate system in which the horizontal axis is $\xi$ and the vertical axis is turbine efficiency $\eta t$. The actual machine used herein refers to a general turbo pump in which the maximum efficiency is about 0.4 to 0.8, and the intersection with the horizontal axis is adjustable to some extent by the angle of the turbine nozzle or the number of stages of the turbine.

As will be understood from FIG. 3, the turbine efficiency curve $\eta_1 t$ (the turbine efficiency curve required for a high-speed response) obtained on the basis of the conditional expression where the number of rotations of the rotary shaft is maintained constant regardless of the pump flow rate is intrinsically different from the turbine efficiency curve $\eta_2 t$ (the realizable turbine efficiency curve) of the actual machine, and there is a portion where efficiency exceeds "1". Accordingly, it seems that it is difficult for realization. However, as represented by a reference numeral A in the drawing, it is understood that there is a region (equivalent region) where both curves are transited while taking very close values, that is, both turbine efficiencies are regarded to be equivalent. This means that, with the use of the equivalent region A of both curves as the turbine operation region, it is possible to realize a turbo pump which satisfies the condition that the number of rotations of the rotary shaft is maintained constant regardless of the pump flow rate, that is, it is possible to realize a turbo pump with a high-speed response.

Since the turbine efficiency curve $\eta_1 t$ required for a high-speed response and the turbine efficiency curve $\eta_2 t$ of the actual machine are different in intrinsic shape, even when the equivalent region A is suitably selected, an error inevitably occurs. This error is accompanied by a slight variation in the number of rotations. Accordingly, it is expected that a response as an engine system becomes slower than the ideal state. However, it is considered that there is no problem from a practical viewpoint.

Figure 4A:
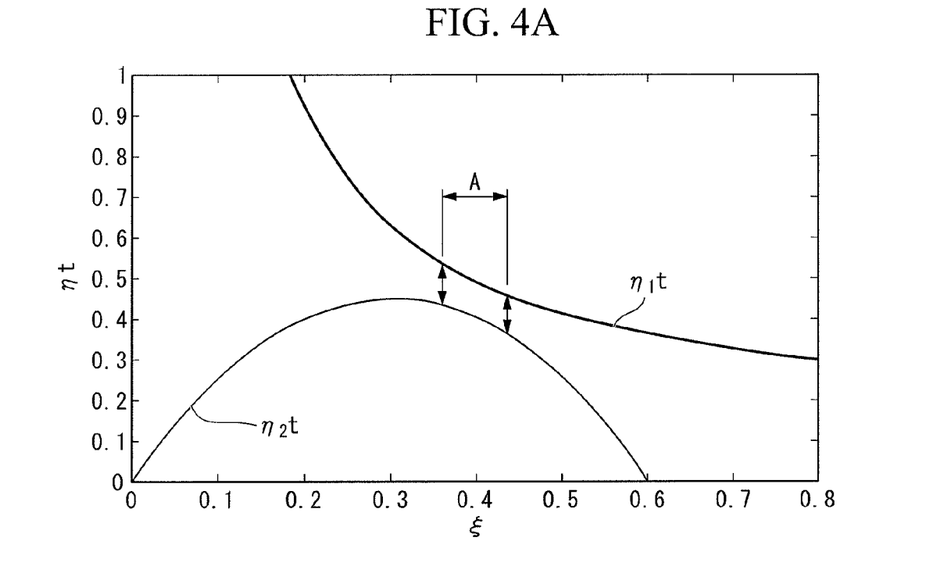
FIG. 4A shows a case where the turbine efficiency curve $\eta_1 t$ required for a high-speed response is different from the case shown in FIG. 3.
Figure 4B:
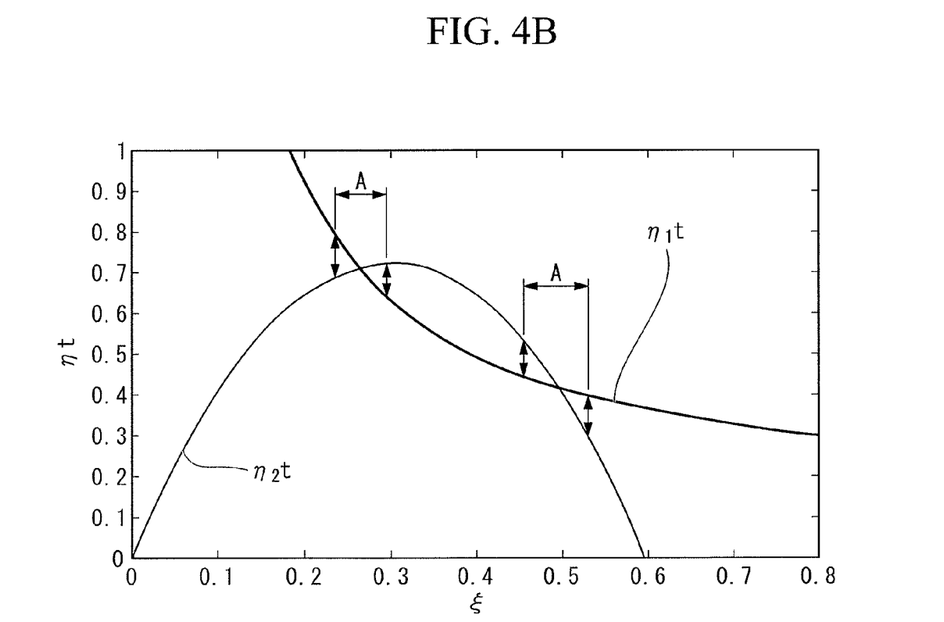
FIG. 4B shows a case where the turbine efficiency curve $\eta_1 t$ required for a high-speed response is different from the case shown in FIG. 3.

The turbine efficiency curve $\eta_1 t$ required for a high-speed response is given by the characteristics of the turbo pump or the operation conditions. At this time, as shown in FIG. 4A, a case where both curves are far away from each other and there is no equivalent region, and as shown in FIG. 4B, a case where both curves intersect at two places and there are two equivalent regions are considered. In the case of FIG. 4A, since there is no solution with the set number of rotations Nc, in an actual engine system, it is considered that, when the number of rotations Nc decreases, the offset amount $L'_1$ is changed and a balance is established. However, in the case of FIG. 4B, it is considered that the number of rotations Nc increases and a balance is established.

Turbine enthalpy drop $\Delta H$ can be adjusted with an increase/decrease in a turbine nozzle equivalent area At, and as a result, the offset amount $L'_1$ can be adjusted. In Expression (26), since a constant β3 is a function of the turbine nozzle equivalent area At, the turbine speed ratio U/C0 can be adjusted with an increase/decrease in the turbine nozzle equivalent area At. The turbine speed ratio U/C0 can be determined by pipe resistance including resistance Rtcv of the fuel-side thrust control valve. The number of rotations Nc can be determined by the balance of the pump characteristics, the turbine characteristics, the heat exchanger characteristics, and the pipe resistance characteristics. At this time, in order to increase the adjustment margin, partial admission is used as a turbine gas passage system, thereby controlling the number of rotations Nc.

[Experimental Result]

The inventors have manufactured a prototype of the rocket engine 1, in which the entire system including the fuel turbo pump 11 has been designed such that the equivalent region A, between the turbine efficiency curve obtained on the basis of the conditional expression (4) where the number of rotations of the rotary shaft is maintained constant regardless of the pump flow rate and the turbine efficiency curve of the actual machine, becomes the turbine operation region of the fuel turbo pump 11, on the basis of the above-described consideration, and have conducted a responsiveness evaluation test.

Figure 5:
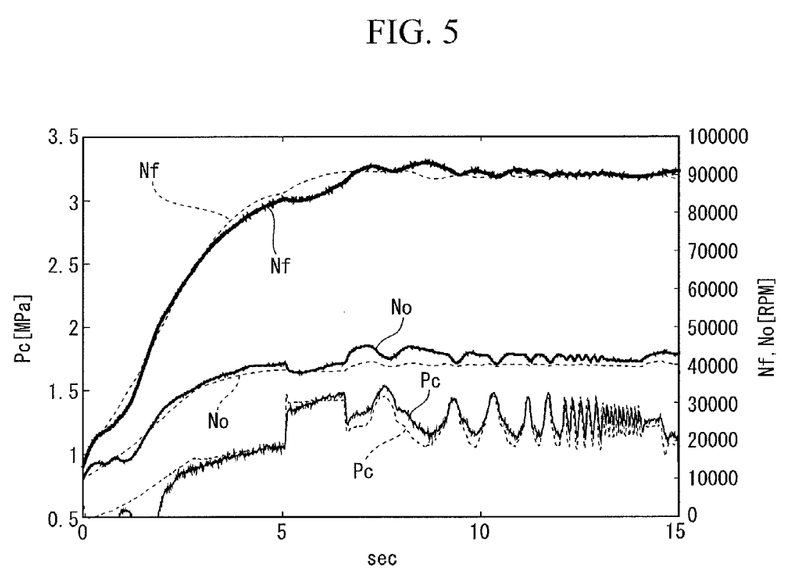
FIG. 5 shows the measurement result of changes in a combustion pressure Pc (thrust) and the number of rotations Nf of a fuel turbo pump 11 over time when a thrust command gradually increases to 0.5 to 10 (Hz) so as to evaluate responsiveness.

FIG. 5 shows the measurement result of changes in the combustion pressure Pc (thrust), the number of rotations Nf of the fuel turbo pump 11, and the number of rotations No of the oxidizer turbo pump 12 over time when a thrust command gradually increases to 0.5 to 10 (Hz) so as to evaluate responsiveness. A broken line in the drawing indicates a calculated value by a simulation, and a solid line indicates a measurement result. As shown in FIG. 5, it is understood that, after six seconds from the start of the system, while the number of rotations Nf of the fuel turbo pump 11 is substantially maintained constant, the combustion pressure Pc (thrust) shows very high-speed responsiveness.

Figure 6:
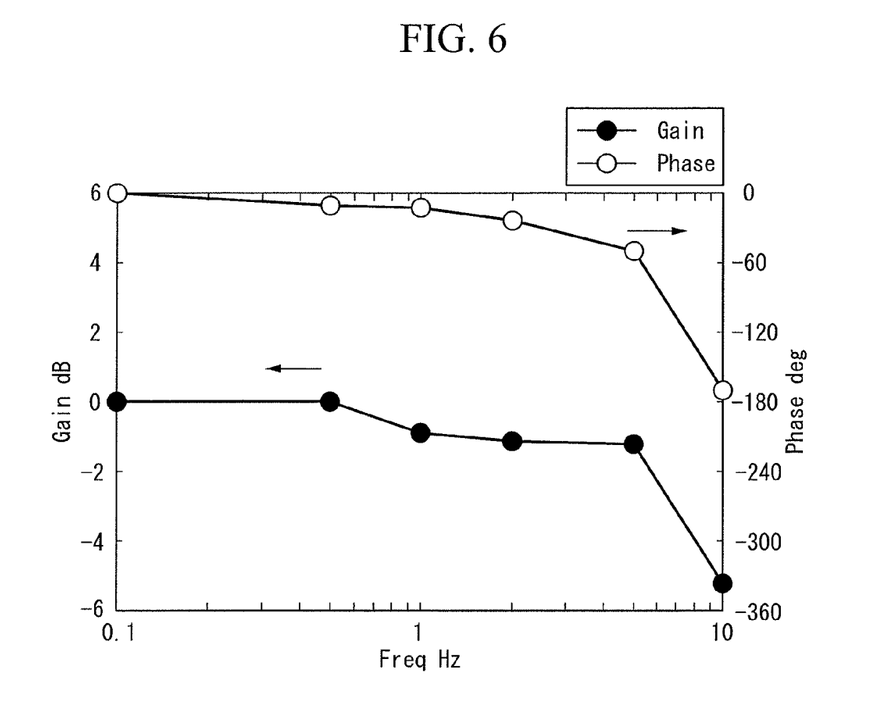
FIG. 6 is a Bode plot showing responsiveness.
Figure 7:
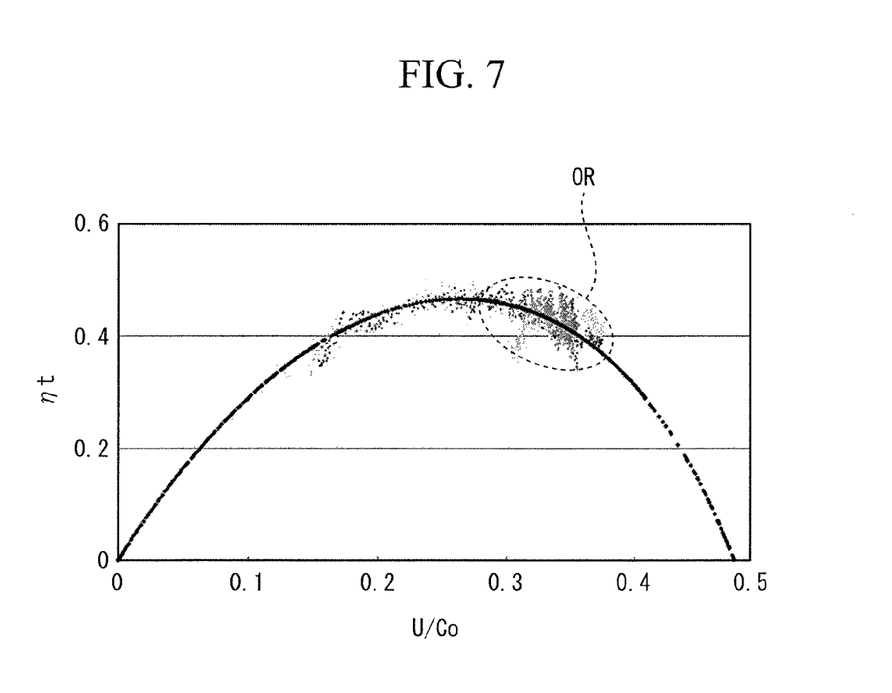
FIG. 7 shows the measurement result of a turbine operation region.

FIG. 6 is a Bode plot showing responsiveness. Although there is a somewhat difference from a linear first-order lag model, if evaluation is conducted at a −3 (dB) point, it may be said that responsiveness of 6 (Hz) or more is shown. Considering that the conventional turbo pump-type rocket engine has responsiveness of 0.2 (Hz), there is a significant improvement. As shown in FIG. 7, it is understood that the turbine operation region OR at this time is in the above-described equivalent region A.

As described above, according to the rocket engine 1 of this embodiment, the entire system including the fuel turbo pump 11 is designed such that the equivalent region A, between the turbine efficiency curve obtained on the basis of the conditional expression (4) where the number of rotations of the rotary shaft is maintained constant regardless of the pump flow rate and the turbine efficiency curve of the actual machine, becomes the turbine operation region of the fuel turbo pump 11, thereby achieving high-speed responsiveness of thrust control regardless of the moment of inertia of the rotary shaft.

The invention is not limited to the foregoing embodiment, and the following modifications are considered. (1) In the foregoing embodiment, a case has been described where, only for the fuel turbo pump 11 in the rocket engine 1, the condition that the number of rotations of the rotary shaft is maintained constant regardless of the pump flow rate is satisfied. This is because responsiveness of thrust control is significantly affected by the moment of inertia of the fuel turbo pump 11, and it should suffice that only the fuel turbo pump 11 is taken into consideration from a practical viewpoint. However, in order to achieve higher-speed responsiveness of thrust control, the entire system including the fuel turbo pump 11 and the oxidizer turbo pump 12 may be designed such that, for both the fuel turbo pump 11 and the oxidizer turbo pump 12, an equivalent region, between a turbine efficiency curve obtained on the basis of a conditional expression where the number of rotations of the rotary shaft is maintained constant regardless of the pump flow rate and a turbine efficiency curve of an actual machine, becomes an operation region.

(2) Although in the foregoing embodiment, an expander cycle engine has been illustrated and described as the rocket engine 1, the invention can be applied to any turbo pump-type rocket engine. The turbo pump according to the invention can be used as, for example, a turbocharger which is mounted in an automobile engine or a marine engine as well as a rocket engine, and can provide an engine having high-speed response with no turbo lag.

INDUSTRIAL APPLICABILITY

According to the invention, since a turbo pump can be operated in an operation region where the number of rotations of the rotary shaft is maintained constant regardless of the pump flow rate, it is possible to provide a turbo pump and a rocket engine capable of realizing high-speed response regardless of the moment of inertia of the rotary shaft.

REFERENCE SIGNS LIST

1: rocket engine
11: fuel turbo pump
12: oxidizer turbo pump
13: fuel-side thrust control valve
14: fuel-side main valve
15: bypass orifice
16: oxidizer-side thrust control valve
17: oxidizer-side main valve
18: combustor

The invention claimed is:

1. A turbo pump in which a pump impeller is connected to one end of a rotary shaft and a turbine is connected to the other end of the rotary shaft,
wherein the turbo pump is designed to operate in an operation region that corresponds to an equivalent region,
the equivalent region corresponding to a region where a difference between a turbine efficiency curve obtained on the basis of a conditional expression where the number of rotations of the rotary shaft is maintained constant regardless of a pump flow rate and a turbine efficiency curve of an actual machine is equal to or smaller than 5%, and the conditional expression is given as Expression (4) having turbine efficiency ηt, pump efficiency ηp, a head coefficient Ψ, a pump flow rate Q, the number of rotations Nc, turbine enthalpy drop ΔH, and turbine inlet fuel density ρ

$$\eta t(Q/Nc) = \frac{Nc^2 \Psi(Q/Nc)}{\eta p(Q/Nc)\rho \Delta H}. \tag{4}$$

2. A rocket engine comprising:

a fuel turbo pump; and an oxidizer turbo pump, wherein the entire system including the fuel turbo pump is designed to operate in an operation region that, in at least the fuel turbo pump, corresponds to an equivalent region, the equivalent region corresponding to a region where a difference between a turbine efficiency curve obtained on the basis of a conditional expression where the number of rotations of the rotary shaft is maintained constant regardless of a pump flow rate and a turbine efficiency curve of an actual machine is equal to or smaller than 5%, and the conditional expression is given as Expression (4) having turbine efficiency ηt, pump efficiency ηp, a head coefficient Ψ, a pump flow rate Q, the number of rotations Nc, turbine enthalpy drop ΔH, and turbine inlet fuel density ρ

$$\eta t(Q/Nc) = \frac{Nc^2 \Psi(Q/Nc)}{\eta p(Q/Nc)\rho \Delta H}. \tag{4}$$

3. The rocket engine according to claim 2, wherein fuel sent from the fuel turbo pump flows into a regenerative cooling heat exchanger provided in a combustor through a fuel-side thrust control valve provided on the downstream side of the fuel turbo pump, is gasified to become gas fuel, is used for turbine driving of the fuel turbo pump and the oxidizer turbo pump, and is supplied to the combustor, and an oxidizer sent from the oxidizer turbo pump is supplied to the combustor through an oxidizer-side thrust control valve provided on the downstream side of the oxidizer turbo pump.

* * * * *